United States Patent
Oono et al.

(10) Patent No.: US 10,804,529 B2
(45) Date of Patent: Oct. 13, 2020

(54) ELECTRODE MATERIAL, METHOD FOR MANUFACTURING ELECTRODE MATERIAL, ELECTRODE, AND LITHIUM ION BATTERY

(71) Applicant: SUMITOMO OSAKA CEMENT CO., LTD., Tokyo (JP)

(72) Inventors: Kouji Oono, Chiba (JP); Satoru Oshitari, Chiba (JP); Masataka Oyama, Chiba (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/282,829

(22) Filed: Feb. 22, 2019

(65) Prior Publication Data

US 2020/0106086 A1 Apr. 2, 2020

(30) Foreign Application Priority Data

Sep. 27, 2018 (JP) ................................ 2018-182506

(51) Int. Cl.
| | | |
|---|---|---|
| *H01M 4/505* | (2010.01) | |
| *H01M 4/525* | (2010.01) | |
| *H01M 10/0525* | (2010.01) | |
| *H01M 4/131* | (2010.01) | |
| *H01M 4/04* | (2006.01) | |
| *H01M 4/02* | (2006.01) | |

(52) U.S. Cl.
CPC ......... *H01M 4/131* (2013.01); *H01M 4/0471* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ...... H01M 4/131; H01M 4/525; H01M 4/505; H01M 10/0525; H01M 4/0471; H01M 2004/028; H01M 2004/021
See application file for complete search history.

(56) References Cited

U.S. PATENT DOCUMENTS

| | | | |
|---|---|---|---|
| 2010/0142121 A1 | 6/2010 | Fujii et al. | |
| 2013/0052535 A1* | 2/2013 | Yanagihara | H01M 4/485 429/220 |
| 2015/0099159 A1* | 4/2015 | Hoshina | H01M 4/5825 429/149 |
| 2016/0190586 A1 | 6/2016 | Hoshina et al. | |
| 2017/0141394 A1* | 5/2017 | Imaji | H01M 10/0525 |
| 2017/0288226 A1 | 10/2017 | Oyama et al. | |
| 2018/0062165 A1 | 3/2018 | Oono et al. | |
| 2018/0277887 A1 | 9/2018 | Yasumiishi et al. | |

FOREIGN PATENT DOCUMENTS

| | | |
|---|---|---|
| CN | 101752099 | 6/2010 |
| CN | 102723489 | 10/2012 |
| CN | 108630910 | 10/2018 |
| JP | 3685364 | 6/2005 |
| JP | 2011-505332 | 2/2011 |
| JP | 2013-069665 | 4/2013 |
| JP | 2013-161654 | 8/2013 |
| JP | 2014-146431 | 8/2014 |
| JP | 2014-207157 | 10/2014 |
| JP | 2016195003 | 11/2016 |
| JP | 2018041719 | 3/2018 |

OTHER PUBLICATIONS

European Search Report, European Patent Office, Application No. 19158002.6, dated Sep. 23, 2019, 10 pages.
Ping Wang et al, "Improved Electrochemical Performance of LiFePO$_4$@N-Doped Carbon Nanocomposites Using Polybenzoxazine as Nitrogen and Carbon Sources", ACS Applied Materials & Interfaces, Sep. 23, 2016, pp. 26908-26915.

* cited by examiner

*Primary Examiner* — Muhammad S Siddiquee
(74) *Attorney, Agent, or Firm* — Greenblum & Bernstein, P.L.C.

(57) ABSTRACT

An electrode material including a carbonaceous-coated electrode active material having primary particles of an electrode active material and secondary particles that are aggregates of the primary particles, and a carbonaceous film that coats the primary particles of the electrode active material and the secondary particles that are the aggregates of the primary particles, in which a proportion of a volume of micropores having a micropore diameter of 50 nm or less in a volume of micropores having a micropore diameter of 300 nm or less, which is obtained using a nitrogen adsorption method, is 40% or more.

6 Claims, 2 Drawing Sheets

ELECTRODE MATERIAL, METHOD FOR MANUFACTURING ELECTRODE MATERIAL, ELECTRODE, AND LITHIUM ION BATTERY

CROSS-REFERENCE TO RELATED APPLICATIONS

This application claims the benefit of Japanese Patent Application No. 2018-182506 filed Sep. 27, 2018, the disclosure of which is herein incorporated by reference in its entirety.

BACKGROUND OF THE INVENTION

Field of the Invention

The present invention relates to an electrode material, a method for manufacturing the electrode material, an electrode formed using the electrode material, and a lithium ion battery including a cathode made of the electrode.

Description of Related Art

In recent years, as small-size, lightweight, and high-capacity batteries, non-aqueous electrolyte-based secondary batteries such as lithium ion batteries have been proposed and put into practical use. Lithium ion batteries are constituted of a cathode and an anode which have properties capable of reversibly intercalating and deintercalating lithium ions and a non-aqueous electrolyte.

Lithium ion batteries weigh less and have a smaller size and a higher energy than secondary batteries of the related art such as lead batteries, nickel-cadmium batteries, and nickel-hydrogen batteries, are used as power supplies for mobile electronic devices such as mobile phones and notebook-type personal computers, and, in recent years, also have been studied as high-output power supplies for electric vehicles, hybrid vehicles, and electric tools. Electrode active materials for batteries that are used as the above-described high-output power supplies are required to have high-speed charge and discharge characteristics. In addition, studies are also made regarding the smoothing of power generation loads or the application to large-scale batteries such as stationary power supplies and backup power supplies, and the absence of problems with resource amounts as well as long-term safety and reliability is also considered to be important.

Cathodes in lithium ion batteries are constituted of an electrode material including a lithium-containing metal oxide having properties capable of reversibly intercalating and deintercalating lithium ions which is called a cathode active material, a conductive auxiliary agent, and a binder, and this electrode material is applied onto the surface of a metallic foil which is called a current collector, thereby producing cathodes. As the cathode active material for lithium ion batteries, generally, lithium cobalt oxide ($LiCoO_2$) is used, and, additionally, lithium (Li) compounds such as lithium nickel oxide ($LiNiO_2$), lithium manganese oxide ($LiMn_2O_4$), and lithium iron phosphate ($LiFePO_4$) are used. Among these, lithium cobalt oxide or lithium nickel oxide has a problem of the toxicity or resource amounts of elements and a problem such as instability in charged states. In addition, lithium manganese oxide is pointed out to have a problem of being dissolved in electrolytes at high temperatures. On the other hand, lithium iron phosphate has excellent long-term safety and reliability, and thus phosphate-based electrode materials having an olivine structure, which are represented by lithium iron phosphate, have been attracting attention in recent years (for example, refer to Japanese Laid-open Patent Publication No. 2013-161654).

SUMMARY OF THE INVENTION

The phosphate-based electrode active materials described in Japanese Laid-open Patent Publication No. 2013-161654 have insufficient electron conductivity and thus, in order to charge and discharge large currents, a variety of means such as the miniaturization of particles and the conjugation with conductive substances is required, and a lot of efforts are being made.

However, conjugation using a large amount of a conductive substance causes a decrease in electrode densities, and thus a decrease in the density of batteries, that is, a decrease in capacities per unit volume is caused. As a method for solving this problem, a carbon coating method using an organic substance solution as a carbon precursor which is an electron conductive substance has been found. In this method in which the organic substance solution and electrode active material particles are mixed together and then the mixture is dried and thermally treated in a non-oxidative atmosphere, thereby carbonizing an organic substance, it is possible to extremely efficiently coat the surfaces of the electrode active material particles with a minimum necessary amount of the electron conductive substance, and conductivity can be improved without significantly decreasing electrode densities.

However, the carbonization temperature of the organic substance which is a carbon source is generally a high temperature, and thus, during the manufacturing of these electrode materials, electrode active material particles come into contact with one another, some of the electrode active material particles are sintered during high-temperature carbonization, the particles grow, and it is not easy to produce fine particles.

In addition, generally, electrode materials for lithium ion batteries are used after being turned into paste by adding a material referred to as a conductive auxiliary agent such as carbon black, a binder represented by polyvinylidene fluoride, and a solvent and then applied onto a metallic foil referred to as a current collector. In order to use a fine electrode material in the above-described paste form, there has been a problem in that a large amount of the solvent is used in order to adjust the viscosity to be suitable for application and a large amount of the binder is used in order to ensure the adhesive force to the current collector, which increases the amounts of materials other than the electrode material used and time and efforts are required to remove the solvent.

The present invention has been made in consideration of the above-described circumstances, and an object of the present invention is to provide an electrode material enabling the obtainment of lithium ion batteries in which the growth of particles is suppressed, coating with a favorable carbonaceous film is realized, and the discharge capacity and the input and output characteristic can be enhanced by decreasing the direct current resistance, a method for manufacturing the electrode material, an electrode formed using the electrode material, and a lithium ion battery including a cathode made of the electrode.

The present inventors carried out intensive studies in order to solve the above-described problem and consequently found that, when an ionic organic substance is used as a carbon source, electrode active material particles coming close to one another is suppressed, the growth and sintering of the particles of electrode active materials due to high temperatures do not easily occur, fine electrode active material particles coated with a favorable carbonaceous film are obtained, and the electrode active material particles are granulated in a granular shape, whereby electrode materials in which the proportion of the volume of micropores having a micropore diameter of 50 nm or less in the volume of micropores having a micropore diameter of 300 nm or less, which is obtained using a nitrogen adsorption method, is equal to or more than a specific value are produced, and the problem can be solved.

The present invention has been completed on the basis of the above-described findings.

That is, the present invention provides the following [1] to [6].

[1] An electrode material including a carbonaceous-coated electrode active material having primary particles of an electrode active material and secondary particles that are aggregates of the primary particles, and a carbonaceous film that coats the primary particles of the electrode active material and the secondary particles that are the aggregates of the primary particles, in which a proportion of a volume of micropores having a micropore diameter of 50 nm or less in a volume of micropores having a micropore diameter of 300 nm or less, which is obtained using a nitrogen adsorption method, is 40% or more.

[2] The electrode material according to [1], in which the electrode active material is an electrode active material represented by General Formula (1).

$$Li_aA_xM_yBO_z \quad (1)$$

(In the formula, A represents at least one element selected from the group consisting of Mn, Fe, Co, and Ni, M represents at least one element selected from the group consisting of Na, K, Mg, Ca, Al, Ga, Ti, V, Cr, Cu, Zn, Y, Zr, Nb, Mo, and rare earth elements, B represents at least one element selected from the group consisting of B, P, Si, and S, $0 \leq a < 4$, $0 < x < 1.5$, $0 \leq y < 1$, and $0 < z \leq 4$).

[3] The electrode material according to [2], in which the electrode active material represented by General Formula (1) is an electrode active material represented by General Formula (2).

$$Li_aA_xM_yPO_4 \quad (2)$$

(In the formula, A, M, a, x, and y are as described above.)

[4] A method for manufacturing the electrode material according to any one of [1] to [3], including: a first step of drying and granulating a slurry obtained by mixing an ionic organic substance as a carbon source, one or more selected from the electrode active material and an electrode active material precursor, and a solvent, using a spray dryer and a second step of thermally treating the granulated substance obtained in the first step in a non-oxidative atmosphere at 600° C. or higher and 1,000° C. or lower.

[5] An electrode formed using the electrode material according to any one of [1] to [3].

[6] A lithium ion battery including: a cathode made of the electrode according to [5].

According to the present invention, it is possible to provide an electrode material enabling the obtainment of a lithium ion batteries in which the growth of particles is suppressed, coating with a favorable carbonaceous film is realized, and the discharge capacity and the input and output characteristic can be enhanced by decreasing the direct current resistance, a method for manufacturing the electrode material, an electrode formed using the electrode material, and a lithium ion battery including a cathode made of the electrode.

DETAILED DESCRIPTION OF THE INVENTION

Electrode Material

An electrode material of the present embodiment includes a carbonaceous-coated electrode active material having primary particles of an electrode active material and secondary particles that are aggregates of the primary particles, and a carbonaceous film that coats the primary particles of the electrode active material and the secondary particles that are the aggregates of the primary particles, and a proportion of a volume of micropores having a micropore diameter of 50 nm or less in a volume of micropores having a micropore diameter of 300 nm or less, which is obtained using a nitrogen adsorption method, is 40% or more.

The electrode active material that is used in the present embodiment is constituted of primary particles and secondary particles that are aggregates of the primary particles. The shape of the electrode active material particle is not particularly limited, but is preferably spherical, particularly, truly spherical. When the electrode active material particle has a spherical shape, internal micropores of a granulated granular body (carbonaceous-coated electrode active material) are likely to be uniform, and a favorable electrolyte-holding capability is developed. In addition, when the carbonaceous-coated electrode active material is produced in a granular body form, it is possible to decrease the amount of a solvent used to prepare a paste for forming an electrode using the electrode material of the present embodiment, and it also becomes easy to apply the paste for forming an electrode to a current collector. Meanwhile, the paste for forming an electrode can be prepared by, for example, mixing the electrode material of the present embodiment, a binder resin (binder), and a solvent.

The electrode active material that is used in the electrode material of the present embodiment is preferably an electrode active material represented by General Formula (1) from the viewpoint of a high discharge capacity, a high energy density, safety, and cycle stability.

$$Li_aA_xM_yBO_z \quad (1)$$

(In the formula, A represents at least one element selected from the group consisting of Mn, Fe, Co, and Ni, M represents at least one element selected from the group consisting of Na, K, Mg, Ca, Al, Ga, Ti, V, Cr, Cu, Zn, Y, Zr, Nb, Mo, and rare earth elements, B represents at least one element selected from the group consisting of B, P, Si, and S, $0 \leq a < 4$, $0 < x < 1.5$, $0 \leq y < 1$, and $0 < z \leq 4$).

In the formula, A is at least one element selected from the group consisting of Mn, Fe, Co, and Ni, and, among these, Mn and Fe are preferred, and Fe is more preferred.

M is at least one element selected from the group consisting of Na, K, Mg, Ca, Al, Ga, Ti, V, Cr, Cu, Zn, Y, Zr, Nb, Mo, and rare earth elements, and, among these, Mg, Ca, Al, and Ti are preferred.

B is at least one element selected from the group consisting of B, P, Si, and S, and, among these, P is preferred from the viewpoint of excellent safety and cycle characteristics.

a is 0 or more and less than 4, preferably 0.5 or more and 3 or less, more preferably 0.5 or more and 2 or less, and particularly preferably 1. x is more than 0 and less than 1.5, preferably 0.5 or more and 1 or less, and, among these, 1 is preferred. y is 0 or more and less than 1 and preferably 0 or more and 0.1 or less. Z is more than 0 and 4 or less and is selected depending on the composition of B. For example, in a case in which B is phosphorus (P), z is preferably 4, and, in a case in which B is boron (B), z is preferably 3.

The electrode active material represented by General Formula (1) preferably has an olivine structure, is more preferably an electrode active material represented by General Formula (2), and still more preferably LiFePO$_4$ or Li(Fe$_{x1}$Mn$_{1-x}$)PO$_4$ (here 0<x1<1) which is LiFePO$_4$ in which some of Fe is substituted by Mn.

$$Li_aA_xM_yPO_4 \quad (2)$$

(In the formula, A, M, a, x, and y are as described above.)

As the electrode active material (Li$_a$A$_x$M$_y$BO$_z$) represented by General Formula (1), an electrode active material manufactured using a method of the related art such as a solid-phase method, a liquid-phase method, or a gas-phase method can be used.

Li$_a$A$_x$M$_y$BO$_z$ is obtained by, for example, hydrothermally synthesizing a slurry-form mixture obtained by mixing a Li source, an A source, an M source, a B source, and water and cleaning the obtained precipitate with water. In addition, the same electrode active material is obtained by generating an electrode active material precursor by means of a hydrothermal synthesis and, furthermore, calcinating the electrode active material precursor. A pressure-resistant airtight container is preferably used in the hydrothermal synthesis.

Here, examples of the Li source include lithium salts such as lithium acetate (LiCH$_3$COO) and lithium chloride (LiCl), lithium hydroxide (LiOH), and the like, and at least one selected from the group consisting of lithium acetate, lithium chloride, and lithium hydroxide is preferably used.

Examples of the A source include chlorides, carboxylates, hydrosulfates, and the like which include at least one element selected from the group consisting of Mn, Fe, Co, and Ni. For example, in a case in which the A source is Fe, examples of the Fe source include divalent iron salts such as iron (II) chloride (FeCl$_2$), iron (II) acetate (Fe(CH$_3$COO)$_2$), and iron (II) sulfate (FeSO$_4$), and, among these, at least one selected from the group consisting of iron (II) chloride, iron (II) acetate, and iron (II) sulfate is preferably used.

As the M source, similarly, it is possible to use chlorides, carboxylates, hydrosulfates, and the like of Na, K, Mg, Ca, Al, Ga, Ti, V, Cr, Cu, Zn, Y, Zr, Nb, Mo, and rare earth elements.

Examples of the B source include compounds including at least one element selected from the group consisting of B, P, Si, and S. For example, in a case in which the B source is P, examples of the P source include phosphoric acid compounds such as phosphoric acid (H$_3$PO$_4$), ammonium dihydrogen phosphate (NH$_4$H$_2$PO$_4$), diammonium phosphate ((NH$_4$)$_2$HPO$_4$), and the like, and at least one selected from the group consisting of phosphoric acid, ammonium dihydrogen phosphate, and diammonium phosphate is preferably used.

The substance amount ratio (Li:A:M:B) of the Li source, the A source, the M source, and the B source is appropriately selected so that a desired electrode active material is obtained and impurities are not generated.

The crystallite diameter of the electrode active material is preferably 30 nm or more and 250 nm or less, more preferably 35 nm or more and 250 nm or less, and still more preferably 40 nm or more and 200 nm or less. When the crystallite diameter is 30 nm or more, the amount of carbon necessary to sufficiently coat the electrode active material surface with a carbonaceous film is suppressed, and the amount of the binder can be suppressed, and thus it is possible to increase the amount of the electrode active material in electrodes and increase the capacities of batteries. Similarly, it is possible to prevent the easy occurrence of film peeling caused by the lack of the binding force is also likely to be caused. On the other hand, when the crystallite diameter is 250 nm or less, the internal resistance of the electrode active material is suppressed, and, in a case in which batteries are formed, it is possible to increase the discharge capacities at a high charge-discharge rate.

Meanwhile, the crystallite diameter can be calculated from the Scherrer's equation using the full width at half maximum of the diffraction peak and the diffraction angle (2θ) of the (020) plane in a powder X-ray diffraction pattern that is measured and obtained using an X-ray diffractometer (for example, RINT2000, manufactured by Rigaku Corporation).

The carbonaceous film that coats the primary particles of the electrode active material and the secondary particles that are the aggregates of the primary particles is obtained by carbonizing an organic substance made of a raw material of the carbonaceous film; however, in order to develop a desired effect, an organic substance (ionic organic substance) having ionicity which has an excellent adsorption capability to the surfaces of the electrode active material particles and is capable of suppressing the electrode active material particles coming close to one another through charge repulsion and steric barrier is used. The ionic organic substance is not particularly limited as long as the ionic organic substance is capable of forming the carbonaceous film on the surfaces of the electrode active material particles, and examples thereof include alkyl benzene sulfonate, alkyl sulfonate, salts of carboxylic acid-modified polyvinyl alcohols, salts of sulfonic acid-modified polyvinyl alcohols, polycarboxylates, polyacrylates, polymethacrylates, and the like. In addition, commercially available ionic surfactants can also be preferably used.

In addition, the present inventors found that, when a nitrogen atom is introduced to the carbonaceous film, it is possible to satisfy both the electron conductivity and the Li ion diffusivity of the carbonaceous film.

The charge polarity of the ionic organic substance or the kind of a counter ion is not particularly limited; however, from the viewpoint of introducing a nitrogen atom to the carbonaceous film, it is preferable to use an anionic ammonium salt, a pyridinium salt, an urea salt, or the like in which a nitrogen-containing base such as ammonia, pyridine, urea, or the like is used as at least some of the counter ion in order to leave a desired amount of nitrogen.

The neutralization ratio of the counter ion is not particularly limited, but needs to be appropriately adjusted in order to obtain a desired absorption force, and is preferably 30 mol % or more. The upper limit value is not particularly limited, but is preferably 100 mol % or less.

Neutralization can be carried out using an alkali such as ammonia, an organic amine, or an alkali metal hydroxide. Among these, ammonia is preferred since there is no concern of the remaining of unnecessary metal.

Similarly, a cationic organic substance containing nitrogen, which is represented by a polyamine hydrochloride such as aniline hydrochloride or polyaniline hydrochloride can also be preferably used. Similarly, the neutralization ratio of the counter ion is not particularly limited, but needs to be appropriately adjusted in order to obtain a desired absorption force, and is preferably 30 mol % or more. The upper limit value is not particularly limited, but is preferably 100 mol % or less.

The ionic organic substance to be used is preferably soluble in solvents for the reason of the easiness of mixing the ionic organic substance and the electrode active material particles and for the purpose of obtaining a uniform coating of the carbonaceous film, and the ionic organic substance is more preferably soluble in water from the viewpoint of disassociation into ions, easiness of handling, safety, prices, and the like.

These ionic organic substances may be used singly or two or more ionic organic substances may be used in mixture.

The average particle diameter of the primary particles of the electrode active material coated with the carbonaceous film (carbonaceous-coated electrode active material) is preferably 30 nm or more and 250 nm or less, more preferably 50 nm or more and 200 nm or less, still more preferably 50 nm or more and 150 nm or less, and far still more preferably 60 nm or more and 100 nm or less. When the average particle diameter is 30 nm or more, it is possible to decrease the amount of the binder necessary for the production of electrodes and increase the capacities of batteries by increasing the amount of the electrode active material in electrodes. On the other hand, when the average particle diameter is 250 nm or less, it is possible to obtain sufficient high-speed charge and discharge performance.

Here, the average particle diameter of the primary particles refers to the number-average particle diameter. The average particle diameter of the primary particles can be obtained by number-averaging the particle diameters of 200 or more particles measured by scanning electron microscope (SEM) observation.

The average particle diameter of the secondary particles of the carbonaceous-coated electrode active material is preferably 0.5 μm or more and 200 μm or less, more preferably 1 μm or more and 150 μm or less, and still more preferably 3 μm or more and 100 μm or less. When the average particle diameter of the secondary particles is 0.5 μm or more, it is possible to suppress an increase in the amount of the conductive auxiliary agent and the binder necessary to prepare electrode material paste by mixing the electrode material, the conductive auxiliary agent, the binder resin (binder), and the solvent. Therefore, it is possible to increase the battery capacities of lithium ion batteries. On the other hand, when the average particle diameter is 200 μm or less, it is possible to increase the discharge capacities of lithium ion batteries in high-speed charge and discharge.

Here, the average particle diameter of the secondary particles refers to the volume-average particle diameter. The average particle diameter of the secondary particles can be measured using a laser diffraction and scattering-type particle size distribution analyzer or the like.

The proportion of nitrogen included in the carbonaceous film is preferably 0.1% or more and 20% or less, more preferably 3% or more and 15% or less, and still more preferably 5% or more and 12% or less. When the proportion of nitrogen included in the carbonaceous film is 0.1% or more, it is possible to satisfy both the electron conductivity of the carbonaceous film and the Li ion diffusivity, and, when the proportion is 20% or less, the electron conductivity of the carbonaceous film does not become too low.

Meanwhile, the proportion of nitrogen included in the carbonaceous film can be calculated from the content of carbon and the content of nitrogen included in the electrode material according to the present embodiment which will be described below.

The thickness (average value) of the carbonaceous film that coats the electrode active material particles is preferably 0.5 nm or more and 6 nm or less, more preferably 0.8 nm or more and 5 nm or less, and still more preferably 0.8 nm or more and 3 nm or less. When the thickness of the carbonaceous film is 0.5 nm or more, it is possible to suppress an increase in the total of the migration resistances of electrons in the carbonaceous film. Therefore, it is possible to suppress an increase in the internal resistance of lithium ion batteries and prevent voltage drop at a high charge-discharge rate. On the other hand, when the thickness is 6 nm or less, it is possible to suppress the formation of steric barrier that hinders the diffusion of lithium ions in the carbonaceous film, and thus the migration resistance of lithium ions decreases. As a result, an increase in the internal resistance of batteries is suppressed, and it is possible to prevent voltage drop at a high charge-discharge rate.

Meanwhile, the thickness of the carbonaceous film can be obtained by capturing the carbonaceous-coated electrode active material using a transmission electron microscope (TEM) or a scanning electron microscope (SEM), measuring the thickness of the carbonaceous film at 100 places from the obtained image of the cross section, and calculating the average value.

The coating ratio of the carbonaceous film to the electrode active material particles is preferably 60% or more and more preferably 80% or more. When the coating ratio of the carbonaceous film is 60% or more, the coating effect of the carbonaceous film can be sufficiently obtained.

Meanwhile, the coating ratio of the carbonaceous film can be obtained by observing the carbonaceous-coated electrode active material using a transmission electron microscope (TEM), an energy dispersive X-ray microanalyzer (EDX), or the like, calculating the proportions of a covered portion in the electrode active material surface, and calculating the average value.

The density of the carbonaceous film is preferably 0.2 $g/cm^3$ or more and 2 $g/cm^3$ or less and more preferably 0.5 $g/cm^3$ or more and 1.5 $g/cm^3$ or less. The density of the carbonaceous film refers to the mass per unit volume of the carbonaceous film.

When the density of the carbonaceous film is 0.2 $g/cm^3$ or more, the carbonaceous film exhibits sufficient electron conductivity. On the other hand, when the density of the carbonaceous film is 2 $g/cm^3$ or less, the amount of the crystals of graphite having a lamellar structure in the carbonaceous film is small, and thus the steric barrier by the fine crystals of graphite is not caused when lithium ions diffuse in the carbonaceous film. Therefore, there is no case in which the lithium ion migration resistance increases. As a result, there is no case in which the internal resistance of lithium ion batteries increases, and voltage drop at a high charge-discharge rate of lithium ion batteries is not caused.

The content of carbon included in the electrode material of the present embodiment is preferably 0.5% by mass or more and 3.5% by mass or less, more preferably 0.8% by mass or more and 2.5% by mass or less, and still more preferably 0.8% by mass or more and 2.0% by mass or less. When the content of carbon is 0.5% by mass or more, it is impossible to sufficiently increase electron conductivity. On the other hand, when the content of carbon is 3.5% by mass or less, it is possible to increase electrode densities.

Meanwhile, the content of carbon can be measured using a carbon analyzer (for example, manufactured by Horiba Ltd., carbon/sulfur analyzer: EMIA-810W).

The content ratio [(N)/(C)] of nitrogen to carbon included in the electrode material of the present embodiment is preferably 0.0005/0.5 to 0.7/3.5 and more preferably 0.05/1.0 to 0.36/3.0 in terms of the mass ratio. When the content ratio [(N)/(C)] is in the above-described range, it is possible to satisfy both the electron conductivity of the carbonaceous film and the Li ion diffusivity.

Meanwhile, the content of nitrogen in the electrode material can be measured using a CHN analyzer (for example, manufactured by Sumika Chemical Analysis Service, Ltd., SUMIGRAPH NCH-22F).

In the electrode material of the present embodiment, the proportion of the volume (Vb) of micropores having a micropore diameter of 50 nm or less in the volume (Va) of micropores having a micropore diameter of 300 nm or less, which is obtained using a nitrogen adsorption method, is 40% or more. When the proportion of Vb in Va is less than 40%, there is a concern that it may be impossible to ensure sufficient electrolyte infiltration properties and electrolyte holding properties while maintaining electrode densities. In addition, the upper limit of the proportion of Vb in Va is preferably less than 60%. When the proportion of Vb in Va is less than 60%, it is possible to suppress a decrease in the electrode density.

Meanwhile, the proportion of Vb in Va can be obtained by measuring the pore size distribution of the electrode material by a nitrogen adsorption method (B. J. H. method) using a gas adsorption measurement instrument (for example, manufactured by MicrotracBEL Corp., trade name: BELSORP-max) and calculating the respective corresponding micropore volumes Va and Vb from the pore size distribution data.

The Va is preferably 0.1 $cm^3/g$ or more and 0.3 $cm^3/g$ or less and more preferably 0.12 $cm^3/g$ or more and 0.25 $cm^3/g$ or less. When the Va is 0.1 $cm^3/g$ or more, electrolyte infiltration properties are sufficiently ensured. On the other hand, when the Va is 0.3 $cm^3/g$ or less, it is possible to suppress a decrease in the electrode density.

In addition, the Vb is preferably 0.04 $cm^3/g$ or more and 0.18 $cm^3/g$ or less and more preferably 0.048 $cm^3/g$ or more and 0.15 $cm^3/g$ or less.

The specific surface area of the electrode material of the present embodiment is preferably 10 $m^2/g$ or more and 30 $m^2/g$ or less, more preferably 12 $m^2/g$ or more and 28 $m^2/g$ or less, and still more preferably 15 $m^2/g$ or more and 27 $m^2/g$ or less. When the specific surface area is 10 $m^2/g$ or more, it is possible to develop sufficient high-speed charge and discharge performance. On the other hand, when the specific surface area is 30 $m^2/g$ or less, it is possible to constitute electrodes without including a large amount of the binder and the conductive auxiliary agent, and thus it is possible to suppress a decrease in the capacities of batteries.

Meanwhile, the specific surface areas can be measured using a specific surface area meter (for example, manufactured by Mountech Co., Ltd., trade name: Macsorb HM model-1208) and the BET1 point method by means of nitrogen ($N_2$) adsorption.

Method for Manufacturing Electrode Material

A method for manufacturing the electrode material of the present embodiment has a first step of drying and granulating a slurry obtained by mixing an ionic organic substance as a carbon source, one or more selected from an electrode active material and an electrode active material precursor, and a solvent using a spray dryer and a second step of thermally treating the granulated substance obtained in the first step in a non-oxidative atmosphere at 600° C. or higher and 1,000° C. or lower.

First Step

The present step is a step of drying and granulating a slurry obtained by mixing an ionic organic substance as a carbon source, one or more selected from an electrode active material and an electrode active material precursor, and a solvent using a spray dryer.

The ionic organic substance, the electrode active material, and/or the electrode active material precursor, the ionic organic substance, the electrode active material, and the electrode active material precursor described in the section of [electrode material] respectively can be used.

When the ionic organic substance is used as a carbon source, it is possible to suppress the migration of the organic substance during the drying and granulation of the slurry obtained by mixing the ionic organic substance, one or more selected from the electrode active material and/or the electrode active material precursor, and a solvent and a thermal treatment described below, favorable carbonaceous films are formed, and it is possible to suppress the particle growth of the electrode active material. In addition, the electrode active material particles coming close to one another is suppressed through the charge repulsion and steric barrier of the ionic organic substance, it becomes difficult for the particle growth and sintering of the electrode active material by a high temperature to occur, and fine electrode active material particles coated with a favorable carbonaceous film are obtained. Furthermore, when the electrode active material particles are granulated in a granular shape, the proportion of the volume (Vb) of micropores having a micropore diameter of 50 nm or less in the volume (Va) of micropores having a micropore diameter of 300 nm or less falls in the above-described range, and it is possible to obtain electrode materials having appropriate micropores.

In addition, as the ionic organic substance, it is preferable to use an anionic organic substance in which a nitrogen-containing base such as an ammonium salt, a pyridinium salt, or an urea salt is used as a counter ion or a cationic organic substance such as a polyamine containing nitrogen, and, in such a case, it is possible to introduce a nitrogen atom to the carbonaceous film and satisfy both the electron conductivity of the carbonaceous film and the Li ion diffusivity.

When the ionic organic substance is used as a carbon source as described above, it is possible to obtain electrode materials which allow the easy production of paste, have excellent coatability, and, during the operation of batteries after being used to produce electrodes, have appropriate electrolyte infiltration capability and holding capability, have a low direct current resistance, and have a high discharge capacity and high input and output characteristics.

First, an ionic organic substance and one or more selected from an electrode active material and an electrode active material precursor are dissolved or dispersed in a solvent, thereby preparing a mixture. A method for dissolving or dispersing the ionic organic substance and one or more selected from the electrode active material and the electrode active material precursor in the solvent is not particularly limited, and it is possible to use, for example, a dispersion device such as a planetary ball mill, an oscillation ball mill, a bead mill, a paint shaker, or an attritor.

Examples of the solvent include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetylacetone, and cyclohexanone; amides such as dimethyl formamide, N,N-dimethylacetoacetamide, and N-methylpyrrolidone; glycols such as ethylene glycol, diethylene glycol, and propylene glycol, and the like. These solvents may be used singly, or two or more solvents may be used in mixture. Among these solvents, a preferred solvent is water.

Meanwhile, a dispersant may be added as necessary.

The blending ratio between the ionic organic substance and one or more selected from the electrode active material and the electrode active material precursor is preferably 0.5 parts by mass or more and 10 part by mass or less in terms of the amount of a carbonaceous substance obtained from the ionic organic substance with respect to 100 parts by mass of an active material that is obtained from one or more selected from the electrode active material and the electrode active material precursor. The actual blending amount varies depending on the carbonization amount (the kind or carbonization conditions of the carbon source) by means of heating carbonization and Is approximately 1 part by mass to 8 parts by mass.

In addition, when the ionic organic substance and one or more selected from the electrode active material and the electrode active material precursor are dissolved and dispersed in a solvent, it is preferable to disperse one or more selected from the electrode active material and the electrode active material precursor in the solvent and then add and stir the ionic organic substance.

Next, the obtained slurry is dried and granulated using a spray dryer, whereby a granulated substance can be obtained.

Second Step

The present step is a step of thermally treating the granulated substance obtained in the first step in a non-oxidative atmosphere at 600° C. or higher and 1,000° C. or lower.

The non-oxidative atmosphere is preferably an inert atmosphere of nitrogen ($N_2$), argon (Ar), or the like, and, in a case in which it is necessary to further suppress oxidation, a reducing atmosphere including approximately several percentages by volume of a reducing gas such as hydrogen ($H_2$) is preferred. In addition, for the purpose of removing organic components evaporated in the non-oxidative atmosphere during the thermal treatment, a susceptible or burnable gas such as oxygen ($O_2$) may be introduced into the inert atmosphere.

The thermal treatment is carried out at a temperature in a range of 600° C. or higher and 1,000° C. or lower, preferably 650° C. or higher and 900° C. or lower, more preferably 700° C. or higher and 850° C. or lower, and still more preferably 700° C. or higher and 800° C. or lower for 1 to 24 hours, preferably 1 to 10 hours, more preferably 1 to 6 hours, and still more preferably 1 to 3 hours.

When the thermal treatment temperature is lower than 600° C., the carbonization of the ionic organic substance becomes insufficient, and there is a concern that it may be impossible to increase electron conductivity, and, when the thermal treatment temperature is higher than 1,000° C., there is a concern that the electrode active material particles may be decomposed or the suppression of particle growth may be impossible.

According to the manufacturing method of the present invention, the ionic organic substance having an excellent adsorption capability to particle surfaces is used as the precursor of the carbonaceous film, and thus the coatability is enhanced. In addition, it is possible to suppress the electrode active material particles coming close to one another through charge repulsion and steric barrier, and thus it is possible to carbonize the ionic organic substance at a high temperature, and it is possible to easily obtain fine and highly reactive electrode materials coated with a carbonaceous substance having higher electron conductivity which do not excessively include carbon. In addition, it is possible to produce granulated bodies which are excellent in terms of the infiltration properties and holding capability of electrolytes and have an appropriate pore size distribution. Electrode materials obtained in the above-described manner are capable of increasing electrode densities, increase discharge capacities at a high charge-discharge rate in a case in which batteries are formed, and enable charging and discharging at a high rate.

In addition, the electrode material of the present embodiment has a large specific surface area and a small particle diameter, and thus favorable responsiveness is exhibited even in charge migration reactions on the surfaces of the electrode active material particles or reactions at a low temperature in which ion diffusivity degrades in the electrode active material particles.

The manufacturing method of the present embodiment is applicable regardless of the kind of the electrode active material and is particularly effective as a method for manufacturing olivine-type phosphate-based electrode materials having low electron conductivity due to the low costs and low environmental loads.

Electrode

An electrode of the present embodiment is formed using the electrode material of the present embodiment.

In order to produce the electrode of the present embodiment, the electrode material, a binder made of a binder resin, and a solvent are mixed together, thereby preparing paint for forming the electrode or paste for forming the electrode. At this time, a conductive auxiliary agent such as carbon black, acetylene black, graphite, ketjen black, natural graphite, or artificial graphite may be added thereto as necessary.

As the binder, that is, the binder resin, for example, a polytetrafluoroethylene (PTFE) resin, a polyvinylidene fluoride (PVdF) resin, fluorine rubber, or the like is preferably used.

The blending ratio between the electrode material and the binder resin is not particularly limited; however, for example, the content of the binder resin is set to 1 part by mass or more and 30 parts by mass or less and preferably set to 3 parts by mass or more and 20 parts by mass or less with respect to 100 parts by mass of the electrode material.

The solvent that is used for the paint for forming the electrode or the paste for forming the electrode may be appropriately selected in accordance with the properties of the binder resin.

Examples thereof include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methylpyrrolidone (NMP), glycols such as ethylene glycol, diethylene glycol, and propylene glycol, and the like. These solvents may be used singly, or a mixture of two or more solvents may be used.

Next, the paint for forming the electrode or the paste for forming the electrode is applied onto one surface of a metallic foil and then is dried, thereby obtaining a metallic foil having a coated film made of a mixture of the electrode material and the binder resin formed on one surface.

Next, the coated film is pressed under pressure and is dried, thereby producing a current collector (electrode) having an electrode material layer on one surface of the metallic foil.

In the above-described manner, direct current resistance is decreased, and it is possible to produce electrodes capable of increasing discharge capacities and input and output characteristics.

Lithium Ion Battery

A lithium ion battery of the present embodiment includes a cathode made of the electrode of the present embodiment. Therefore, the lithium ion battery of the present embodiment decreases the direct current resistance and has a high discharge capacity and high input and output characteristics.

In the lithium ion battery of the present embodiment, an anode, an electrolyte, a separator, and the like are not particularly limited. For example, as the anode, it is possible to use an anode material such as metallic Li, a carbon material, a Li alloy, or $Li_4Ti_5O_{12}$. In addition, instead of the electrolyte and the separator, a solid electrolyte may be used.

EXAMPLES

Hereinafter, the present invention will be specifically described using examples and comparative examples. Meanwhile, the present invention is not limited to forms described in the examples.

For example, in the present examples, acetylene black is used as a conductive auxiliary agent, but a carbon material such as carbon black, graphite, Ketjen black, natural graphite, or artificial graphite may also be used. In addition, batteries in which natural graphite is used as a counter electrode will be evaluated, but it is needless to say that other carbon materials such as artificial graphite and coke, metallic anode materials such as metallic Li or Li alloys, and oxide-based anode materials such as $Li_4Ti_5O_{12}$ may also be used. In addition, as a non-aqueous electrolyte (a solution of a non-aqueous electrolyte), an electrolyte which includes 1 mol/L of $LiPF_6$ and is produced by mixing ethylene carbonate and ethyl methyl carbonate 3:7 in terms of % by volume, but an electrolyte in which $LiBF_4$ or $LiClO_4$ is used instead of $LiPF_6$ and propylene carbonate or diethyl carbonate is used instead of ethylene carbonate may be used. In addition, instead of the electrolyte and the separator, a solid electrolyte may be used.

Manufacturing Example 1: Manufacturing of Electrode Active Material ($LiFePO_4$)

$LiFePO_4$ was hydrothermally synthesized in the following manner.

LiOH as a Li source, $NH_4H_2PO_4$ as a P source (B source), and $FeSO_4 \cdot 7H_2O$ as a Fe source (A source) were used and were mixed into pure water so that the substance amount ratio (Li/Fe/P) therebetween reached 3:1:1, thereby preparing a homogeneous slurry-form mixture (200 mL).

Next, this mixture was put into a pressure-resistant airtight container having a capacity of 500 mL and was hydrothermally synthesized at 170° C. for 12 hours. After this reaction, the mixture was cooled to room temperature (25° C.), thereby obtaining a cake-form reaction product which was precipitated in the container. This precipitate was sufficiently cleaned a plurality of times with distilled water, and the water content ratio was maintained at 30% so as to prevent the precipitate from being dried, thereby producing a cake-form substance. A slight amount of this cake-form substance was sampled, powder obtained by drying the cake-form substance in a vacuum at 70° C. for two hours was measured using an X-ray diffractometer (product name: RINT2000, manufactured by Rigaku Corporation), and it was confirmed that single-phase $LiFePO_4$ was formed.

Manufacturing Example 2: Manufacturing of Electrode Active Material ($LiMnPO_4$)

$LiMnPO_4$ was synthesized in the same manner as in Manufacturing Example 1 except for the fact that $MnSO_4 \cdot H_2O$ was used instead of $FeSO_4 \cdot 7H_2O$ as the Fe source and the reaction was a hydrothermal synthesis at 150° C. for 12 hours.

Manufacturing Example 3: Manufacturing of Electrode Active Material ($Li[Fe_{0.25}Mn_{0.75}]PO_4$)

$Li[Fe_{0.25}Mn_{0.75}]PO_4$ was synthesized in the same manner as in Manufacturing Example 2 except for the fact that a mixture of $FeSO_4 \cdot 7H_2O$ and $MnSO_4 \cdot H_2O$ (at a substance amount ratio of 25:75) was used as the Fe source.

Example 1

$LiFePO_4$ (electrode active material) (20 g) obtained in Manufacturing Example 1 and ammonium dodecylbenzenesulfonate (1 g) as a carbon source were mixed into water and crushed and mixed using a ball mill together with zirconia balls (150 g) having 5 mmφ, thereby obtaining a slurry (mixture).

Next, the obtained slurry was dried and granulated using a two-fluid nozzle-type spray dryer. After that, the obtained granulated substance was thermally treated at a temperature of 720° C. for 2.5 hours, thereby obtaining an electrode material made of a carbonaceous-coated electrode active material.

Example 2

$LiMnPO_4$ (electrode active material) (19 g) obtained in Manufacturing Example 2, a mixed solution of lithium carbonate, iron (II) acetate, and phosphoric acid (Li:Fe:P=1:

1:1) equivalent to 1 g of as LiFePO$_4$ a carbonization catalyst, and ammonium dodecylbenzenesulfonate (2.5 g) as a carbon source were mixed into water and crushed and mixed using a ball mill together with zirconia balls (150 g) having 5 mmϕ, thereby obtaining a slurry (mixture).

Next, the obtained slurry was dried and granulated using a two-fluid nozzle-type spray dryer. After that, the obtained granulated substance was thermally treated at a temperature of 750° C. for four hours, thereby obtaining an electrode material made of a carbonaceous-coated electrode active material.

Example 3

Li[Fe$_{0.25}$Mn$_{0.75}$]PO$_4$ (electrode active material) (20 g) obtained in Manufacturing Example 3 and carboxylic acid-modified polyvinyl alcohol (manufactured by Kuraray Co., Ltd., trade name: KL-318, 1.2 g) as a carbon source were mixed into water and neutralized using ammonia water so that the neutralization ratio of a carboxyl group of the carboxylic acid-modified polyvinyl alcohol reached 100 mol %. After that, the components were crushed and mixed using a ball mill together with zirconia balls (150 g) having 5 mmϕ, thereby obtaining a slurry (mixture).

Next, the obtained slurry was dried and granulated using a two-fluid nozzle-type spray dryer. After that, the obtained granulated substance was thermally treated at a temperature of 750° C. for four hours, thereby obtaining an electrode material made of a carbonaceous-coated electrode active material.

Example 4

An electrode material made of a carbonaceous-coated electrode active material was obtained in the same manner as in Example 3 except for the fact that the neutralization ratio of the carboxyl group of the carboxylic acid-modified polyvinyl alcohol (manufactured by Kuraray Co., Ltd., trade name: KL-318) reached 50 mol %.

Example 5

Li[Fe$_{0.25}$Mn$_{0.75}$]PO$_4$ (electrode active material) (20 g) obtained in Manufacturing Example 3 and an ammonium carboxylate-based surfactant (manufactured by Toagosei Co., Ltd., trade name: ARON A-6114, 1.2 g) as a carbon source were mixed into water. After that, the components were crushed and mixed using a ball mill together with zirconia balls (150 g) having 5 mmϕ, thereby obtaining a slurry (mixture).

Next, the obtained slurry was dried and granulated using a two-fluid nozzle-type spray dryer. After that, the obtained granulated substance was thermally treated at a temperature of 780° C. for four hours, thereby obtaining an electrode material made of a carbonaceous-coated electrode active material.

Comparative Example 1

An electrode material made of a carbonaceous-coated electrode active material of Comparative Example 1 was obtained in the same manner as in Example 2 except for the fact that sucrose (2.5 g) was used instead of the ammonium dodecylbenzenesulfonate (2.5 g) as a carbon source.

Comparative Example 2

An electrode material made of a carbonaceous-coated electrode active material of Comparative Example 2 was obtained in the same manner as in Example 3 except for the fact that the carboxylic acid-modified polyvinyl alcohol (manufactured by Kuraray Co., Ltd., trade name: KL-318) was used without being neutralized.

Comparative Example 3

An electrode material made of a carbonaceous-coated electrode active material of Comparative Example 3 was obtained in the same manner as in Example 3 except for the fact that native polyvinyl alcohol was used instead of the carboxylic acid-modified polyvinyl alcohol (manufactured by Kuraray Co., Ltd., trade name: KL-318).

Production of Lithium Ion Batteries

The electrode material obtained in each of the examples and the comparative examples, acetylene black (AB) as a conductive auxiliary agent, and a polyvinylidene fluoride (PVdF) resin as a binder were mixed into N-methylpyrrolidone (NMP) so that the weight ratio (the electrode material/AB/PVdF) therebetween reached 90:5:5, thereby producing cathode material paste. The obtained paste was applied and dried on a 30 μm-thick aluminum foil and was pressed so as to obtain a predetermined density, thereby producing an electrode plate.

A plate-like specimen having a coated surface with an area of 3×3 cm$^2$ and an allowance for a tab around the coated surface was obtained from the obtained the electrode plate by means of punching, and the tap was welded, thereby producing a test electrode.

Meanwhile, as a counter electrode, similarly, a coated electrode obtained by applying natural graphite was used. As a separator, a porous polypropylene film was employed. In addition, a lithium hexafluorophosphate (LiPF$_6$) solution (1 mol/L) was used as a non-aqueous electrolyte (a solution of a non-aqueous electrolyte). Meanwhile, as a solvent that was used in the LiPF$_6$ solution, a solvent obtained by mixing ethylene carbonate and ethyl methyl carbonate 3:7 in terms of % by volume and adding vinylene carbonate (2%) thereto as an additive was used.

In addition, laminate-type cells were produced using the test electrode, the counter electrode, and the non-aqueous electrolyte produced in the above-described manner and were used as batteries of the examples and the comparative examples.

Evaluation of Electrode Materials

For the electrode materials obtained in the examples and the comparative examples and the components included in the electrode materials, properties were evaluated. The evaluation methods are as described below. Meanwhile, the results are shown in Table 1.

1. Amount of Carbon in Electrode Material

The amount (% by mass) of carbon in the electrode material was measured using a carbon analyzer (manufactured by Horiba Ltd., carbon/sulfur combustion analyzer EMIA-810W).

2. Amount of Nitrogen in Electrode Material

The amount (% by mass) of nitrogen in the electrode material was measured using a CHN analyzer (manufactured by Sumika Chemical Analysis Service, Ltd., SUMIGRAPH NCH-22F).

3. Proportion of Nitrogen in Carbonaceous Film

The proportion (%) of nitrogen in the carbonaceous film was calculated from the amount of carbon obtained in (1) and the amount of nitrogen obtained in (2).

4. Specific Surface Area of Electrode Material

The specific surface area of the electrode material was measured using a specific surface area meter (for example, manufactured by Mountech Co., Ltd., trade name: Macsorb HM model-1208) and the BET1 point method by means of nitrogen ($N_2$) adsorption.

5. Crystallite Diameter of Electrode Active Material

The crystallite diameter of the electrode active material was calculated from the Scherrer's equation using the full width at half maximum of the diffraction peak and the diffraction angle (2θ) of the (020) plane in a powder X-ray diffraction pattern measured using an X-ray diffractometer (product name: RINT2000, manufactured by Rigaku Corporation).

6. Pore Size Distribution of Electrode Material, Volume (Va) of Micropores Having Micropore Diameter of 300 nm, and Volume (Vb) of Micropores Having Micropore Diameter of 50 nm The pore size distribution of the electrode material was measured by a nitrogen adsorption method (B. J. H. method) using a gas adsorption measurement instrument (for example, manufactured by MicrotracBEL Corp., trade name: BELSORP-max), the respective corresponding micropore volumes Va and Vb from the pore size distribution data were calculated, and the proportion of Vb in Va was obtained.

Figure 1:
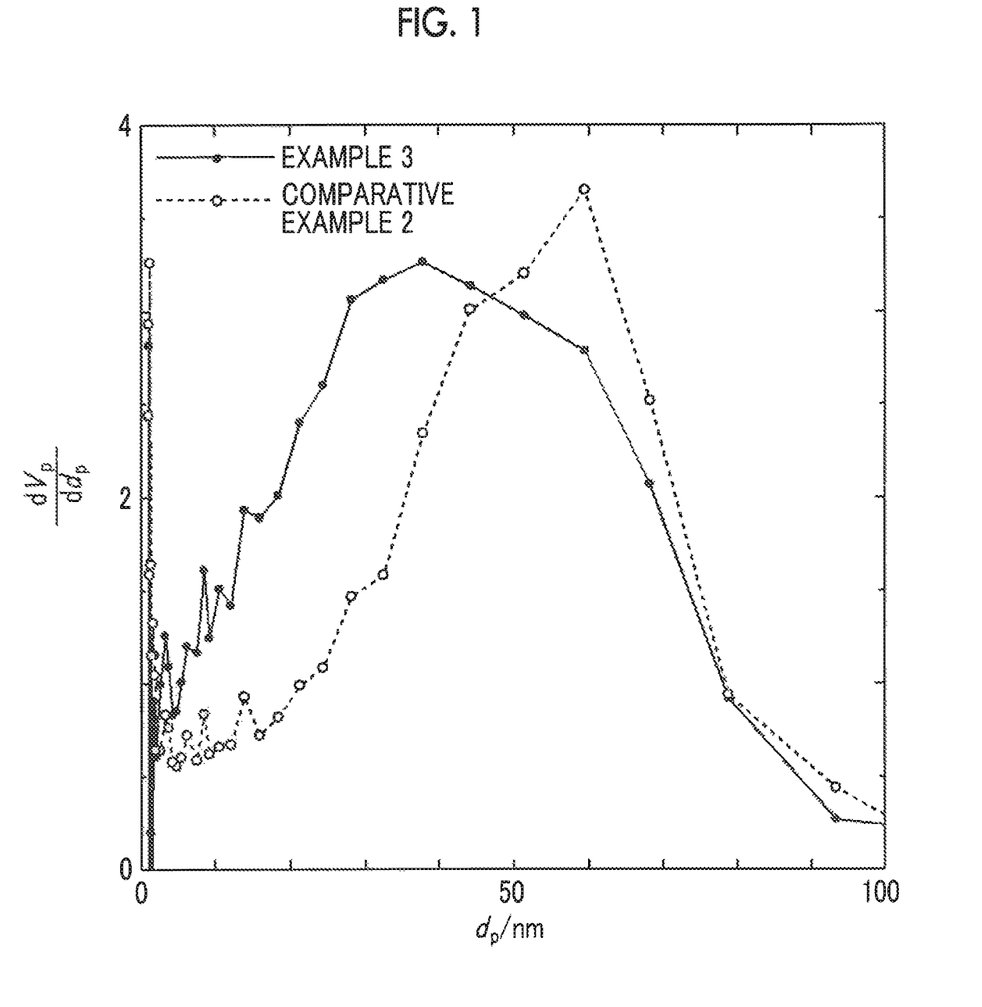
FIG. 1 illustrates micropore volume distributions of electrode materials of Example 3 and Comparative Example 2.
Figure 2:
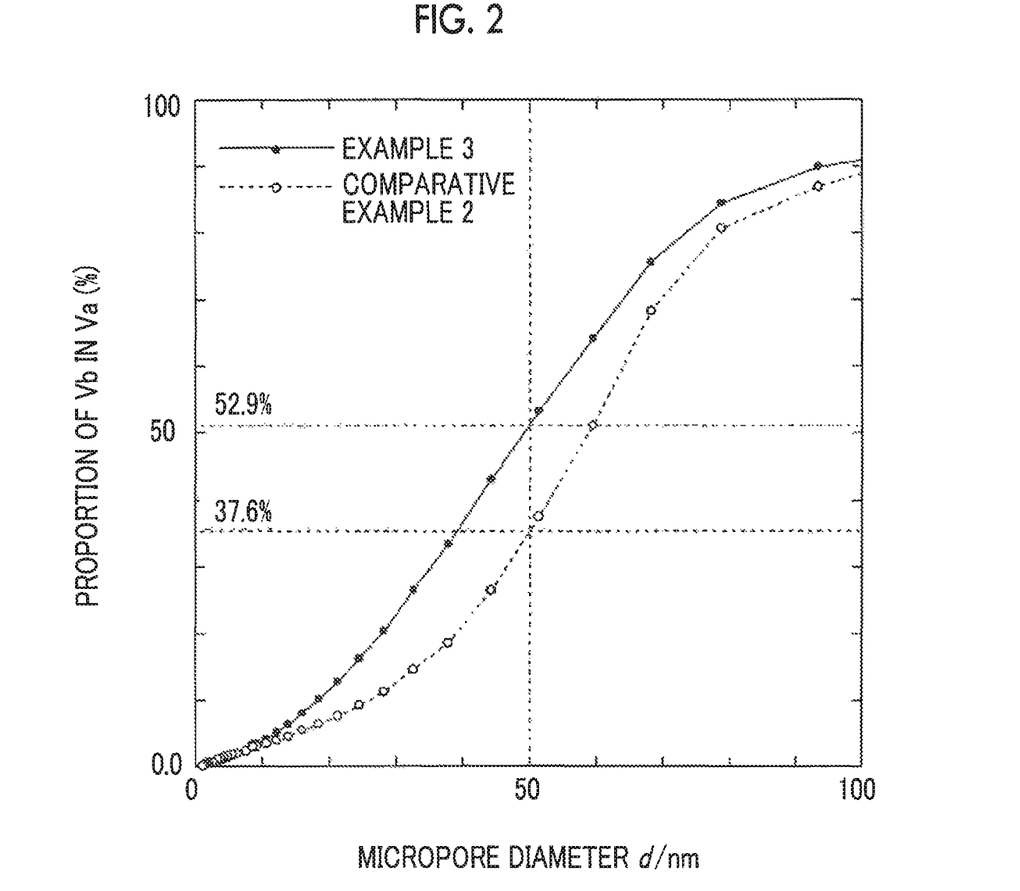
FIG. 2 is a graph in which micropore diameters d (nm) are plotted in a horizontal axis and proportions of a volume (Vb) of micropores having a micropore diameter of 50 nm or less in a volume (Va) of micropores having a micropore diameter of 300 nm or less which is obtained using a nitrogen adsorption method is plotted in a vertical axis for the electrode materials of Example 3 and Comparative Example 2.

Meanwhile, FIG. 1 illustrates the micropore volume distributions of the electrode materials of Example 3 and Comparative Example 2, and, for the electrode materials of Example 3 and Comparative Example 2, a graph in which the micropore diameters d (nm) are plotted in the horizontal axis and the proportions of Vb in Va are plotted in the vertical axis is illustrated in FIG. 2.

Evaluation of Electrodes and Lithium Ion Batteries

Discharge capacities and direct current resistances (DCR) of charging and discharging were measured using the lithium ion batteries obtained in the examples and the comparative examples. The results are shown in Table 1.

1. Discharge Capacity

Discharge capacities were measured at an ambient temperature of 30° C. by means of constant-current charging and discharging with a charge current set to 1 C, a discharge current set to 5 C, and a cut-off voltage set to 2.5 to 4.1 V (vs natural graphite) for the lithium ion battery of Examples 1 and to 2.5 to 4.2 V (vs natural graphite) for the lithium ion batteries of Examples 2 to 5 and Comparative Examples 1 to 3.

2. Direct Current Resistance (DCR) of Charging and Discharging

The lithium ion batteries were charged with a current of 0.1 C at an ambient temperature of 25° C. for five hours, and the depths of charge were adjusted (state of charge (SOC) 50%). On the batteries adjusted to SOC 50%, "1C charging for 10 seconds→10-minute rest→1C discharging for 10 seconds→10-minute rest" as a first cycle, "3C charging for 10 seconds→10-minute rest→3C discharging for 10 seconds→10-minute rest" as a second cycle, "5C charging for 10 seconds→10-minute rest→5C discharging for 10 seconds→10-minute rest" as a third cycle, and "10C charging for 10 seconds→10-minute rest→10C discharging for 10 seconds→10-minute rest" as a fourth cycle were sequentially carried out. Voltages 10 seconds after the respective charging and discharging during the cycles were measured. Individual current values were plotted along the horizontal axis, and the voltages after 10 seconds were plotted along the vertical axis, thereby drawing approximate straight lines. The slopes of the approximate straight lines were respectively considered as direct current resistances during charging (charging DCR) and direct current resistances during discharging (discharging DCR).

TABLE 1

| | Electrode active material | Amount of carbon in electrode material (% by mass) | Amount of nitrogen in electrode material (% by mass) | Proportion of nitrogen in carbonaceous film (%) | Specific surface area of electrode material ($m^2/g$) | Crystallite diameter of electrode active material (nm) |
|---|---|---|---|---|---|---|
| Example 1 | $LiFePO_4$ | 1.2 | 0.12 | 9.1 | 16 | 75 |
| Example 2 | $LiMnPO_4$ | 2 | 0.23 | 10.3 | 26 | 50 |
| Example 3 | $Li[Fe_{0.25}Mn_{0.75}]PO_4$ | 1.9 | 0.21 | 10 | 26 | 51 |
| Example 4 | $Li[Fe_{0.25}Mn_{0.75}]PO_4$ | 1.8 | 0.12 | 6.3 | 23 | 52 |
| Example 5 | $Li[Fe_{0.25}Mn_{0.75}]PO_4$ | 1.9 | 0.22 | 10.4 | 27 | 50 |
| Comparative Example 1 | $LiMnPO_4$ | 1.7 | Equal to or lower than detectable lower limit | — | 16 | 86 |
| Comparative Example 2 | $Li[Fe_{0.25}Mn_{0.75}]PO_4$ | 1.7 | Equal to or lower than detectable lower limit | — | 14 | 87 |
| Comparative Example 3 | $Li[Fe_{0.25}Mn_{0.75}]PO_4$ | 1.7 | Equal to or lower than detectable lower limit | — | 14 | 87 |

| | Micropore volume (Va) ($cm^3/g$) | Micropore volume (Vb) ($cm^3/g$) | Proportion of Vb in Va (%) | 5 C discharge capacity (mAh/g) | Charging DCR (Ω) | Discharging DCR (Ω) |
|---|---|---|---|---|---|---|
| Example 1 | 0.132 | 0.066 | 50.4 | 145 | 5.2 | 4.1 |
| Example 2 | 0.211 | 0.113 | 53.6 | 126 | 10.4 | 7.2 |
| Example 3 | 0.208 | 0.11 | 52.9 | 130 | 9.8 | 6.6 |
| Example 4 | 0.201 | 0.086 | 42.8 | 130 | 9.8 | 6.7 |

TABLE 1-continued

| | | | | | | |
|---|---|---|---|---|---|---|
| Example 5 | 0.207 | 0.114 | 55.1 | 131 | 9.7 | 6.5 |
| Comparative Example 1 | 0.195 | 0.066 | 33.8 | 109 | 16 | 20 |
| Comparative Example 1 | 0.181 | 0.068 | 37.6 | 110 | 13 | 8.5 |
| Comparative Example 3 | 0.19 | 0.066 | 34.7 | 111 | 10.5 | 8.4 |

SUMMARY OF RESULTS

In the examples, as the precursor of the carbonaceous film, the ionic organic substances which had an excellent adsorption capability to particle surfaces and was capable of suppressing the electrode active material particles coming close to one another through charge repulsion and steric barrier were used, and thus the electrode materials in which the particle growth and sintering of the electrode active material by a high temperature did not easily occur, fine electrode active material particles coated with a favorable carbonaceous film were obtained, furthermore, the electrode active material particles coming close to one another was suppressed even when spherical granular bodies were obtained by spraying and drying, the electrolyte infiltration properties and the electrolyte holding capability was excellent, and appropriate micropores were present were obtained (refer to FIG. 1 and FIG. 2).

It could be confirmed that, due to the above-described effects, the electron conductivity of the carbonaceous film sufficiently improves, the discharge capacity increases, and the direct current resistance decreases.

On the other hand, in the electrode materials of the comparative examples, the growth of particles in association with the thermal treatment occurred, and the electrode active material particles came excessively close to one another during the obtainment of the spherical granular bodies by spraying and drying, and thus the pore size distributions suitable for the electrolyte infiltration properties and the electrolyte holding properties were lost (refer to FIG. 1 and FIG. 2). As a result, the discharge capacities decreased, and increases in the direct current resistances were observed.

The electrode material of the present invention is useful for cathodes in lithium ion batteries.

What is claimed is:

1. An electrode material comprising:
   primary particles of an electrode active material coated with a carbonaceous film and secondary particles that are aggregates of the primary particles,
   wherein the electrode active material is an electrode active material represented by General Formula (1), $$Li_aA_xM_yBO_z \quad (1)$$

(in the formula, A represents at least one element selected from the group consisting of Mn, Fe, Co, and Ni, M represents at least one element selected from the group consisting of Na, K, Mg, Ca, Al, Ga, Ti, V, Cr, Cu, Zn, Y, Zr, Nb, Mo, and rare earth elements, B represents at least one element selected from the group consisting of B, P, Si, and S, $0 \leq a < 4$, $0 < x < 1.5$, $0 \leq y < 1$, and $0 < z \leq 4$),
   wherein a proportion of a volume of micropores having a micropore diameter of 50 nm or less in a volume of micropores having a micropore diameter of 300 nm or less, which is obtained using a nitrogen adsorption method, is 40% or more and less than 60%, and
   wherein a proportion of nitrogen included in the carbonaceous film is 0.1% by mass or more and 20% by mass or less.

2. The electrode material according to claim 1,
   wherein the electrode active material represented by General Formula (1) is an electrode active material represented by General Formula (2), $$Li_aA_xM_yPO_4 \quad (2)$$

(in the formula, A, M, a, x, and y are as described above).

3. A method for manufacturing the electrode material according to claim 1, comprising:
   drying and granulating a slurry using a spray dryer to obtain a granulated substance, said slurry is obtained by mixing only (i) an ionic organic substance as a carbon source, (ii) at least one of the electrode active material and an electrode active material precursor, and (iii) a solvent, wherein the ionic organic substance is selected from the group consisting of an anionic ammonium salt, a pyridinium salt, and an urea salt; and
   thermally treating the granulated substance obtained in the drying and granulating in a non-oxidative atmosphere at 600° C. or higher and 1,000° C. or lower.

4. An electrode formed using the electrode material according to claim 1.

5. A lithium ion battery comprising:
   a cathode made of the electrode according to claim 4.

6. The electrode material according to claim 1,
   wherein the proportion of a volume of micropores having a micropore diameter of 50 nm or less in a volume of micropores having a micropore diameter of 300 nm or less, which is obtained using a nitrogen adsorption method, is 42.8% to 55.1%.

* * * * *

UNITED STATES PATENT AND TRADEMARK OFFICE
CERTIFICATE OF CORRECTION

| | |
|---|---|
| PATENT NO. | : 10,804,529 B2 |
| APPLICATION NO. | : 16/282829 |
| DATED | : October 13, 2020 |
| INVENTOR(S) | : K. Oono et al. |

It is certified that error appears in the above-identified patent and that said Letters Patent is hereby corrected as shown below:

In the Claims

Column 20, Line 41, Claim 3, Line 11, please delete "obtained in the drying and granulating".

Signed and Sealed this
Twentieth Day of April, 2021

Drew Hirshfeld
*Performing the Functions and Duties of the
Under Secretary of Commerce for Intellectual Property and
Director of the United States Patent and Trademark Office*